Oct. 15, 1963 E. W. HOGUE 3,107,308

TRANSISTORIZED MAGNETIC AMPLIFIER AND AMPLIFIER-COMPLEMENTER FOR DIGITAL COMPUTER CIRCUITS

Filed Sept. 23, 1960

INVENTOR.
EPHRAIM W. HOGUE

BY Wade Koontz and George O. Saile

ATTORNEYS

United States Patent Office 3,107,308
Patented Oct. 15, 1963

3,107,308
TRANSISTORIZED MAGNETIC AMPLIFIER AND AMPLIFIER-COMPLEMENTER FOR DIGITAL COMPUTER CIRCUITS

Ephraim W. Hogue, Montgomery County, Md., assignor to the United States of America as represented by the Secretary of the Air Force Filed Sept. 23, 1960, Ser. No. 58,148
2 Claims. (Cl. 307—88.5)
(Granted under Title 35, U.S. Code (1952), sec. 266)

The invention described herein may be manufactured and used by or for the United States Government for governmental purposes without payment to me of any royalty thereon.

The invention relates to an electronic computer circuitry and, more particularly, to a digital magnetic core amplifier circuit.

Semiconductor diode gating, because of its economy, flexibility, and dependability, is widely used to perform the logical functions of a high-speed electronic computer. To overcome the loss of signal power through the gates, amplifiers are inserted into the gating structure at intervals to regenerate the signal. Presently, vacuum tubes and transistors are commonly used to amplify the signal in such cases. Saturable core reactors, however, because of their compactness, dependability, and low-power consumption, in many cases can be more effectively, used as amplifiers than vacuum tubes and transistors.

It is thus an object of this invention to provide a digital power amplifier circuit that may be inserted into an electronic computer gating structure at intervals to effectively regenerate the loss of signal power.

It is another object of this invention to provide a digital power amplifier circuit including a transistor and saturable core reactor combination that may be inserted into an electronic computer gating structure at intervals to speedily amplify and transmit pulses, corresponding to binary ONES, or no pulses to ZEROS, depending upon the input of the stage.

It is a further object of this invention to provide a digital complementing amplifier circuit including a transistor and saturable core reactor combination that may be inserted into an electronic computer gating structure at intervals to speedily amplify, complement, and transmit pulses, corresponding to binary ONES, or no pulses to ZEROS, depending upon the input of the stage.

Briefly, the amplifier comprises, as the amplifying element, a saturable core reactor with two windings. The core has a substantially rectangular hysteresis loop so that it can be abruptly switched between two states of magnetic saturation. The amplifier is controlled by two oppositely phased sinusoidal signals derived from the computer clock signal generator. During each negative half-cycle of one clock signal the digital input to be amplified is applied to one winding of the reactor to set it in the appropriate magnetic state. During each negative half-cycle of the other clock signal the other winding of the reactor is connected to an output circuit that produces the appropriate digital output depending upon the magnetic state of the core. In a modification of the circuit the digital output of the amplifier is the complement of the digital input.

The nature of the invention, further objects and advantages will appear more fully upon consideration of the embodiments illustrated in the accompanying drawings and hereinafter to be described.

Figure 1:
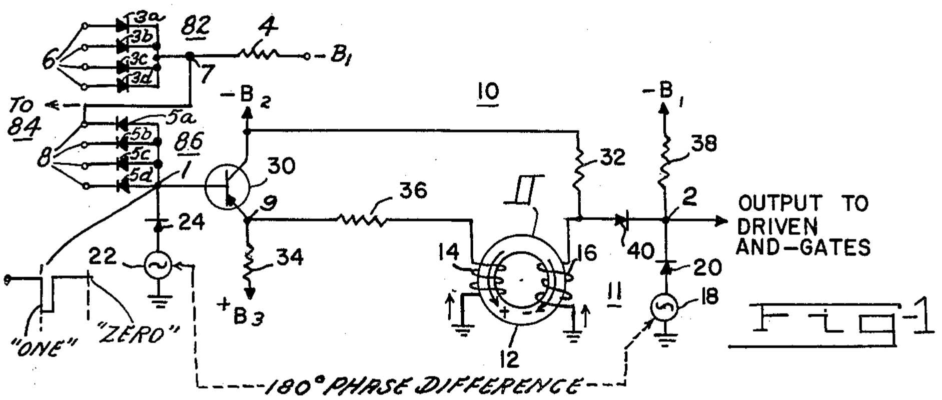
FIGURE 1 is a schematic diagram of the digital power amplifier circuit of the invention.
Figure 3:
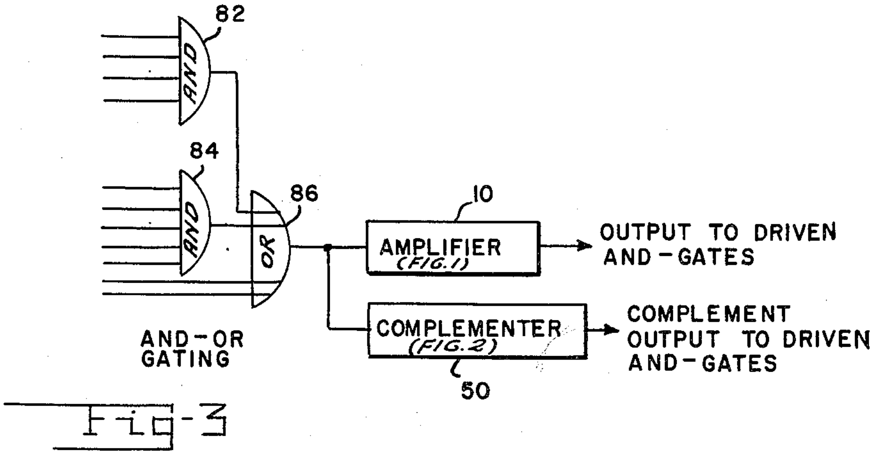

Referring now more particularly to FIG. 1, the amplifier 10 has an input terminal 1 and an output terminal 2. Power for the amplifier is supplied by a power source (not shown) supplying constant direct potentials $-B_1$, $-B_2$ and $+B_3$ relative to ground. Digital input signals are applied between the input terminal 1 and ground, and are regenerated slightly later in amplified form at the output terminal 2. In the specific circuit shown the input signals consist of a pulse of negative voltage to represent the binary digit ONE and the absence of a pulse, i.e., zero or ground voltage, to represent the binary digit ZERO. The input signals may be derived from diode AND and OR gates as represented at 82, 84 and 86 in FIG. 3. The output signals may be used to drive further diode AND gates (not shown). Diode networks performing the logical functions AND and OR are well known in the art and are adequately described in the literature. For example, diode gates for use with negative signals are shown and described on pages 1314–1315 and pages 1381–1383 of the Proceedings of the I.R.E., volume 41, No. 10, October 1953. Thus, as seen in FIG. 1, AND gate 82 of FIG. 3 may be constituted by four diodes *3a–3d* connected through pull-up resistor 4 to $-B_1$ and OR gate 86 may be constituted by four diodes *5a–5d* connected through the emitter-base junction of transistor 30 and resistor 34 to $+B_3$. AND gate 84 may be constructed in the same manner as gate 82. In accordance with the well known operation of AND and OR logical circuits, ONE signals, i.e., negative pulses, must appear simultaneously at all input terminals 6 in order for a ONE (negative voltage) to appear at output terminal 7; whereas, a ONE (negative voltage) at any of the input terminals 8 of OR gate 86 will result in a ONE (negative voltage) at its output terminal 1. On the other hand, a ZERO (zero or ground voltage) at any input terminal 6 of AND gate 82 results in a ZERO (zero or ground voltage) at its output terminal 7; but a ZERO must occur at all input terminals of OR gate 86 for a ZERO to occur at its output terminal 1.

The transistor 30 is connected as an emitter follower which is analogous in operation to a cathode follower in vacuum tube circuits. With terminal 1 at ground potential, the output terminal 9 of the emitter follower stage is only slightly above ground potential, due to the voltage drop across load or output resistor 34, and the output of the stage is substantially zero. If a ONE, i.e., a negative voltage, is applied to terminal 1 the emitter is made positive relative to the base. However, any increase in the potential of the emitter relative to the base results in an increase in collector current through resistor 34 and winding 14 and resistor 36 so that the emitter follows the base downward in potential, staying above it only by the amount necessary to maintain the collector current. Because of the current gain of the transistor this potential difference is small so that the potential of point 9 is always only slightly greater than that of point 1, or, in other words, the voltage gain of the emitter follower stage is slightly less than unity. Therefore, a ONE (negative voltage) at input terminal 1 results in a negative voltage relative to ground at terminal 9. Although the voltage gain of the stage is less than unity the current gain, or the ratio of a change in collector current to the causative change in base current, is high. As for a cathode follower, the output impedance of the emitter follower stage is low.

The saturable core reactor 11 is the principal amplifying element. It comprises a magnetic core 12 of the type having a substantially rectangular hysteresis characteristic as indicated by the small hysteresis diagram adjacent the core. A core of this type has two sharply defined stable magnetic states in one of which the core is saturated in one flux direction and in the other of which it is saturated in the other direction. It can be abruptly switched from either of these states to the other by the application of a magnetomotive force of sufficient magnitude in the proper direction. Windings 14 and 16 are so wound on the core 12 that currents in the directions of the current arrows will produce fluxes in opposite directions in the core as indicated by the flux arrows. For convenience, these flux directions may be designated + and − as indicated in FIG. 1. The circuit parameters are such that the magnetomotive force produced by the upward current in winding 14 in the presence of a ONE (negative voltage) at terminal 9 and the magnetomotive force produced by the upward current in winding 16 due to conduction in diode 40 are each sufficient to switch the magnetic state of the core.

The operation of the amplifier is controlled and synchronized by the computer clock signal which, for example, may be a 300 kc./s. sine wave supplied throughout the computer for synchronizing purposes. This signal is available in two phases, 180° apart, from a low impedance clock signal source (not shown). The sine wave clock signal of one phase is represented at 18 and the clock signal of the other or opposite phase is represented at 22. In serial binary code, the time spacing between successive bits is equal to the period of the clock signal.

The winding 16 is coupled to the output terminal 2 of the amplifier by means of an output AND gate consisting of diodes 20 and 40 and pull-up resistor 38. The anodes of diodes 20 and 40 may be considered the two input terminals of the gate and terminal 2 is the output terminal. As is characteristic of an AND gate, ONES (negative voltages) must occur simultaneously at both input terminals in order for a ONE (negative voltage) to appear at output terminal 2. This is true since the presence of resistor 38 prevents the cathode of either diode from falling appreciably below the potential of its anode. Therefore, terminal 2 cannot fall appreciably below the potential of either anode and, consequently, both anodes must be negative in order for terminal 2 to be negative.

The operation of the amplifier of FIG. 1 as a whole will now be considered. Here it should be pointed out that the amplifier accepts as input signals the potentials appearing on input terminal 1 during each negative half-cycle of clock signal 22 and produces the corresponding amplified output signals at output terminal 2 during the negative half-cycles of clock signal 18. Since signals 22 and 18 are in phase opposition, the amplifier introduces a delay of one-half the period of the clock signal. Consider first that clock signal 22 is in its positive half-cycle and that core 12 is saturated in the − direction. In this condition, regardless of the input to the amplifier from OR gate 86, the emitter of transistor 30 is negative relative to its base since signal 22 is greater than $+B_3$, and consequently there is no emitter current. A small current flows from $+B_3$ through resistors 34 and 36 and downward through winding 14 to ground. This current has no effect on core 12 since it is in such direction as to produce flux in the − direction and the core is already saturated in this direction. Clock signal 18 is in its negative half-cycle, since it is 180° out of phase with signal 22. Therefore, diode 40 is conductive and current flows upward from ground through winding 16 and diode 40, then divides with part flowing through resistor 38 to $-B_1$ and the remainder flowing to a single input circuit in each of one or more AND gates driven in parallel by the amplifier. These driven AND gates are identical to AND gate 82, already described. These currents therefore eventually pass through the input diodes and through a pull-up resistor, such as resistor 4 of gate 82, to $-B_1$. Since the current flow in winding 16 is in the − flux direction, in which direction the core is already saturated, there is no change in flux and the impedance offered by winding 16 to the current is only that due to its resistance, which is low. Therefore, there is substantially no potential drop across winding 16 and output terminal 2 is at substantially zero or ground potential. The above current is in addition to a small biasing current that flows constanly in the same direction through winding 16 and resistor 32 to $-B_2$.

Consider next the conditions in the amplifier circuit during the next half-cycle of the clock signal, which is the negative half-cycle for signal 22 and the positive half-cycle for signal 18, and further that a ZERO (zero or ground voltage) input signal is applied to input terminal 1 from OR gate 86. The emitter of transistor 30 and point 9 are now at substantially ground potential since the base is at the potential of input terminal 1. Consequently an insignificant current flows in winding 14 which does not affect the − saturation of the core. Signal 18 is now in its positive half-cycle and diode 40 is cut off so that the current flow in winding 16 is reduced from its value in the preceding half-cycle to the small biasing current through resistor 16. This current change has no effect on the − saturation state of core 12.

Consider now the next half-cycle of the clock signal which is the positive half-cycle for signal 22 and the negative half-cycle of signal 18. As before, during the positive half-cycle of signal 22, transistor 30 is cut off and there is no effect on the magnetic state of core 12 which remains in a state of − saturation. Diode 40, however, is now conductive since signal 18 is in its negative half-cycle and there is a large increase in current flowing upward through winding 16, through diode 40 and through resistor 38 and the connected input circuits of the driven AND gates to $-B_1$, as explained before. Since core 12 is already in a state of − saturation this increase in current produces no change in flux in the core and winding 16 offers no impedance to the current flow other than its resistance which is low. Therefore an insignificant voltage drop occurs across this winding and, since the voltage drop across diode 40 in the forward direction is low, terminal 2 is at substantially ground potential representing a ZERO output. This output ZERO corresponds to the input ZERO that occurred on input terminal 1 one-half clock period earlier. By the same process, a ZERO appears at output terminal 2 at each negative half-cycle of clock signal 18 as long as ZERO inputs continue to be applied to input terminal 1.

Assume now that during the next negative half-cycle of signal 22 a ONE (negative voltage) is applied to input terminal 1 from OR gate 86. This causes an emitter current and a larger collector current, due to the current gain of the transistor 30, to flow in resistor 34, lowering the potential of point 9 to a negative value relative to ground. This causes current to flow from ground upward through winding 14 to point 9, switching the magnetic state of core 12 from − saturation to + saturation. During this time, signal 18 is in its positive half-cycle and as a result winding 16 is disconnected from output terminal 2 at diode 40 which is now back-biased and nonconductive. One half-cycle later, when signal 18 is in its negative half-cycle, diode 40 is again conductive and current flows from ground upward through winding 16, diode 40, resistor 38 and the driven AND gates to $-B_1$, as before. Since core 12 was placed in the state of + saturation during the preceding half-cycle of the clock signal by the ONE on input terminal 1, as explained above, the current in winding 16 causes the core to switch from this state to its − saturation state and this change in flux causes winding 16 to offer a high impedance to current flowing through it. A negative potential is therefore developed across this winding which pulls the potential of output terminal 2 down to a negative value relative to ground, thus generating a ONE (negative pulse) at this terminal. This ONE is an amplified regeneration of the input ONE that appeared on input terminal 1 one-half clock period earlier.

Figure 2:
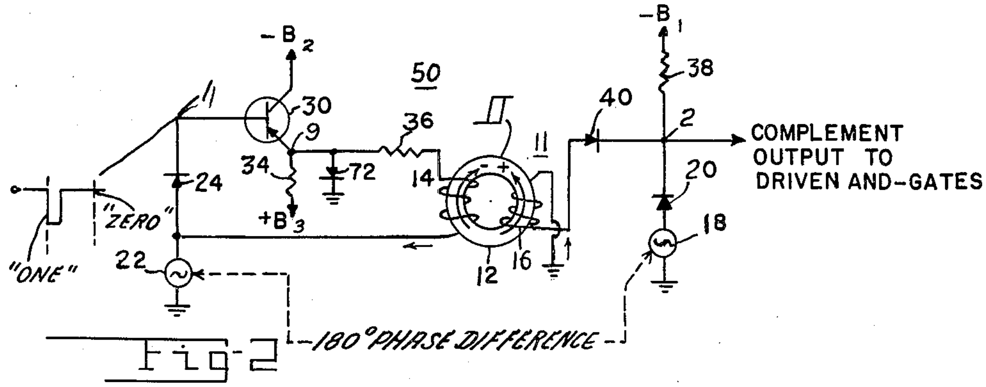
FIGURE 2 is a schematic diagram of a digital complementing amplifier circuit of the invention; and, FIGURE 3 is a schematic diagram showing how the amplifier and the NOT-amplifier are connected in parallel to diode gating for receiving the same signals at their inputs.

The foregoing explains how the amplifier 10 reproduces, at output terminal 2, the same information bit, ONE or ZERO, that occurred one-half clock cycle earlier at input terminal 1. The purpose of the circuit 50 of FIG. 2 is to produce, at output terminal 2, the complement of the bit that occurred one-half cycle earlier at input terminal 1. The structural changes from the amplifier of FIG. 1, which consist in connecting clamping diode 72 between the emitter of transistor 30 and ground, applying clock signal 22 to the lower end of winding 14 and reversing the connections to winding 16, are designed to cause a ZERO at terminal 1 during the negative half-cycle of signal 22 to saturate core 12 in the − direction and a ONE at terminal 1 during the negative half-cycle to saturate core 12 in the + direction.

Referring to FIG. 2, with the connections to winding 16 interchanged, it is apparent that a current through the winding in the direction indicated by the arrow will saturate the core 12 in the + direction. Therefore, if core 12 has + saturation at the start of a negative half-cycle of clock signal 18 a ZERO will be produced at output terminal 2 and, if it has − saturation, a ONE will be generated because of the high impedance of winding 16 when the magnetic state of the core is switched.

With a ZERO (zero or ground potential) on input terminal 1 during a negative half-cycle of clock signal 22, point 9 is substantially at ground potential due to clamping diode 72 and a current flows from this point downward through winding 14 and signal source 22 to ground and thence through the $+B_3$ source and resistor 34 back to point 9, saturating core 12 in the − direction. During this half-cycle signal 18 is positive and diode 40 nonconductive. During the next half-cycle of signal 18, which is a negative half-cycle, current flow from ground through winding 16 and diode 40 and thence through resistor 38 and the driven AND gates, as explained for FIG. 1, switches the magnetization to + saturation, producing a ONE (negative voltage), the complement of the ZERO at terminal 1 during the preceding half-cycle, at output terminal 2. The core switching is aided by current from clock signal source 22, which is now in its positive half-cycle, flowing upward through winding 14 and thence through resistor 36 and diode 72 to ground.

With a ONE (negative voltage) on input terminal 1 during a negative half-cycle of signal 22, point 9 has a negative potential relative to ground, due to the collector current of transistor 30 flowing in resistor 34, and therefore the downward flow of current from point 9 through winding 14 is reduced to zero or below the value required to switch the core 12 magnetization. The core therefore remains in a state of + saturation and a ZERO, the complement of the ONE at terminal 1, is produced at terminal 2 during the ensuing negative half-cycle of signal 18. It will be noted that the delay produced by complementer 50 is the same as that produced by amplifier 10, namely, one-half of the clock signal period.

The output AND gate, consisting of pull-up resistor 38, diodes 20 and 40 and source $-B_1$, is incorporated in the output circuit of the amplifier and complementer to provide for transmitting the output signal to many remotely located points with resulting high total output lead capacitance. The insertion of this AND gate is necessary because the magnetic element 11 has a high output impedance during the transmission of ONES and is therefore incapable of developing an acceptable signal across the lead capacitance. The value of resistor 38 is adjusted to provide sufficient current to drive all the ground capacitance of the connecting leads—up to several hundred picofarads—which run from the amplifier or complementer to all the gates driven by them. As a result, the current carried by a driven gate never need be greater than is required by the core directly associated with it. In this manner a single stage can drive as many as thirty other stages.

I claim:

1. An amplifier for digital signals comprising: a saturable core reactor having a magnetic core with a substantially rectangular hysteresis loop and a pair of windings thereon; a transistor having emitter, base and collector electrodes; means for applying digital input signals between said base and a point of reference potential; a diode having one electrode connected to said base; a source of direct current connected between said collector and said reference point; a load resistor connected between said emitter and said reference point; means connecting one of said windings between said emitter and said reference point; an output AND gate comprising two input terminals and an output terminal, a diode connected between each input terminal and said output terminal and a resistor connected between said output terminal and a source of direct current, said diodes being poled for forward conduction in the same direction relative to said output terminal, means for connecting the other winding of said reactor between one input terminal of said AND gate and said reference point; means for applying an alternating potential between the other electrode of the diode connected to said base and said reference point and means for applying an alternating potential between the other input terminal of said AND gate and said reference point, said alternating potentials being of the same frequency and opposite in phase; said AND gate output terminal serving as the output terminal of said amplifier.

2. An amplifier-complementer for digital signals comprising: a saturable core reactor having a magnetic core with a substantially rectangular hysteresis loop and a pair of windings thereon; a transistor having emitter, base and collector electrodes; means for applying digital input signals between said base and a point of reference potential; a diode having one electrode connected to said base; a source of direct current connected between said collector and said reference point; a load resistor connected between said emitter and said reference point; means connecting one end of one of said windings to said emitter; means for applying a first alternating potential between the other terminal of said diode and said reference point and between the other end of said one winding and said reference point; a clamping diode connected between said emitter and said reference point; an output AND gate comprising two input terminals and an output terminal, a diode connected between each input terminal and said output terminal and a resistor connected between said output terminal and a source of direct current, said diodes being poled for forward conduction in the same direction relative to said output terminal, means for connecting the other winding of said reactor between one input terminal of said AND gate and said reference point; means for applying a second alternating potential between the other input terminal of said AND gate and said reference point; said first and second alternating voltages being of the same frequency and opposite in phase, and said AND gate output terminal serving as the output terminal of said amplifier complementer.

References Cited in the file of this patent

UNITED STATES PATENTS 2,953,741 Pittman ---------------- Sept. 20, 1960